United States Patent
Karunakaran

(10) Patent No.: US 9,288,810 B2
(45) Date of Patent: Mar. 15, 2016

(54) WIRELESS MEDIA SHARING FROM MULTIPLE SOURCES TO A SINGLE SINK

(71) Applicant: QUALCOMM Incorporated, San Diego, CA (US)

(72) Inventor: Sanal Kumar Karunakaran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 196 days.

(21) Appl. No.: 14/098,008

(22) Filed: Dec. 5, 2013

(65) Prior Publication Data

US 2015/0163788 A1 Jun. 11, 2015

(51) Int. Cl.
 *H04L 12/28* (2006.01)
 *H04W 72/04* (2009.01)
 *H04W 56/00* (2009.01)
 *H04W 84/20* (2009.01)
 *H04L 29/06* (2006.01)
 *H04L 29/08* (2006.01)

(52) U.S. Cl.
 CPC ......... *H04W 72/048* (2013.01); *H04L 65/1083* (2013.01); *H04L 65/608* (2013.01); *H04L 67/148* (2013.01); *H04L 67/28* (2013.01); *H04W 56/001* (2013.01); *H04W 84/20* (2013.01)

(58) Field of Classification Search
 USPC ........................................................ 370/254
 See application file for complete search history.

(56) References Cited

U.S. PATENT DOCUMENTS

| | | | |
|---|---|---|---|
| 7,743,135 B2 | 6/2010 | Azuma | |
| 2009/0251608 A1* | 10/2009 | Kato | G06F 3/14 348/564 |
| 2009/0296608 A1 | 12/2009 | Khan et al. | |
| 2009/0322948 A1* | 12/2009 | Funabiki | G06F 3/14 348/571 |
| 2011/0125909 A1* | 5/2011 | Maes | H04L 65/1083 709/227 |
| 2012/0098733 A1 | 4/2012 | Masuda et al. | |
| 2013/0078904 A1 | 3/2013 | Yang | |
| 2013/0223278 A1 | 8/2013 | Inada | |
| 2013/0234913 A1* | 9/2013 | Thangadorai | G06F 3/1423 345/2.1 |
| 2014/0022146 A1* | 1/2014 | Thangadorai et al. | 345/2.3 |
| 2015/0067549 A1* | 3/2015 | Chang | G06F 3/0488 715/761 |

FOREIGN PATENT DOCUMENTS

| | | | | |
|---|---|---|---|---|
| EP | 1855447 A1 | * | 11/2007 | |
| EP | 1954001 A2 | | 8/2008 | |
| IL | EP 1855447 A1 | * | 11/2007 | ........ H04L 29/06027 |

OTHER PUBLICATIONS

"Wi-Fi Certified Miracast™: Extending the Wi-Fi experience to seamless video display," Wi-Fi Alliance, Sep. 19, 2012, 18 pp.
International Search Report and Written Opinion from International Application No. PCT/US2014/062654, dated Feb. 4, 2015, 11 pp.

* cited by examiner

*Primary Examiner* — Faruk Hamza
*Assistant Examiner* — Shah R Zaman
(74) *Attorney, Agent, or Firm* — Shumaker & Sieffert, P.A.

(57) ABSTRACT

In one example, a method includes, during operation of a wireless media share session between a primary source device and a sink device, transferring, from the primary source device to a secondary source device using a wireless link, transmission rights to the media share session with the sink device.

18 Claims, 8 Drawing Sheets

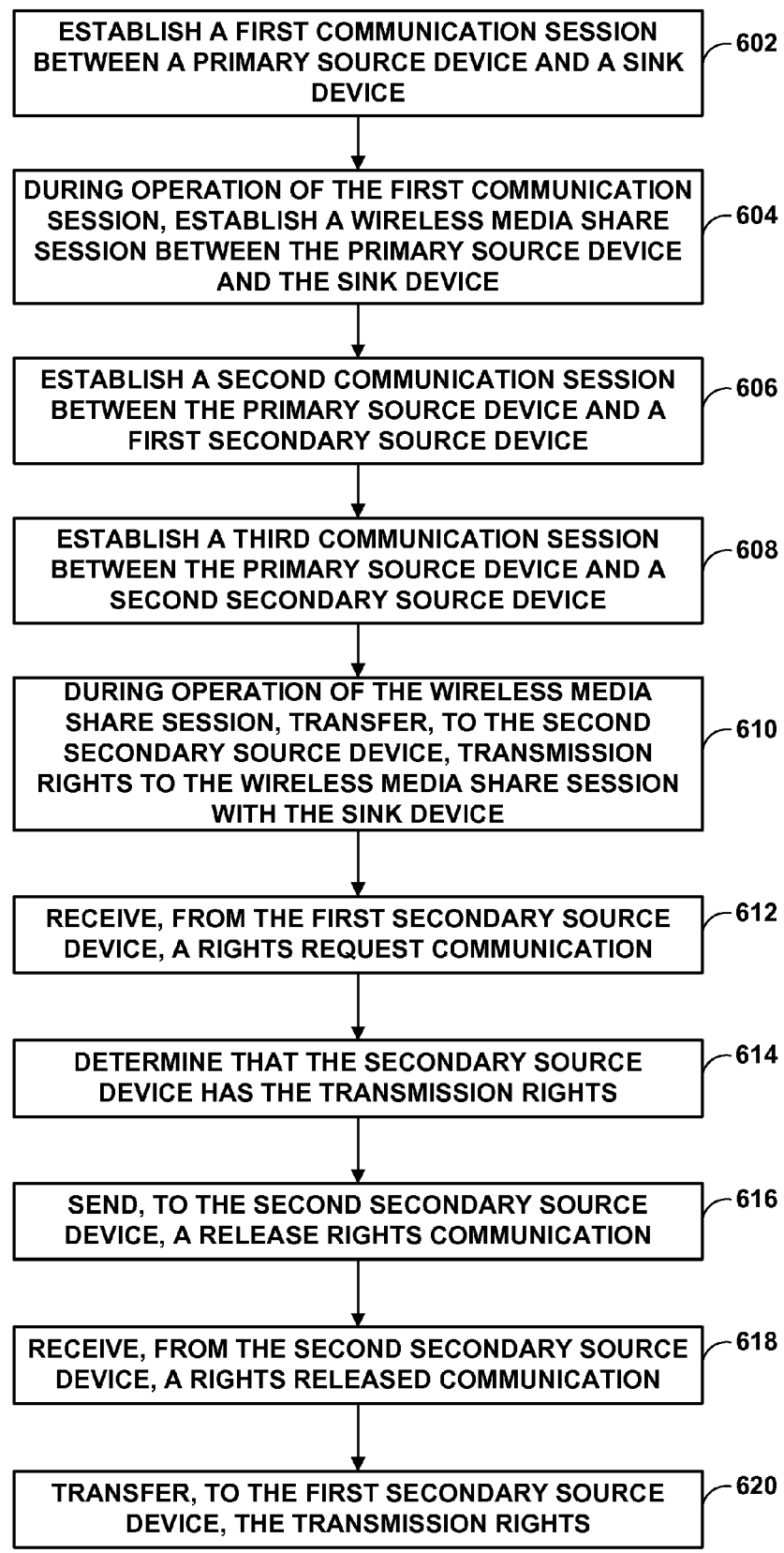

WIRELESS MEDIA SHARING FROM MULTIPLE SOURCES TO A SINGLE SINK

TECHNICAL FIELD

This disclosure relates to transmission rights to a media share session and, more particularly, the transfer of transmission rights to a media share session.

BACKGROUND

Wireless display (WD) or Wi-Fi Display (WFD) systems include source devices and sink devices. The source devices and the sink devices may be either mobile devices or wired devices with wireless communication capabilities. As mobile devices, for example, the source device and the sink devices may include mobile telephones, portable computers with wireless communication cards, personal digital assistants (PDAs), portable media players, digital image capturing devices, such as a camera or camcorder, or other flash memory devices with wireless communication capabilities, including so-called "smart" phones and "smart" pads or tablets, or other types of wireless communication devices. As wired devices, for example, the source device and the sink devices may comprise televisions, desktop computers, monitors, projectors, printers, audio amplifiers, set top boxes, gaming consoles, routers, and digital video disc (DVD) players, media servers, and the like that include wireless communication capabilities.

A source device may send media data, such as audio and video (AV) data, to one or more of the sink devices participating in a particular media share session. The media data may be played back at both a local display of the source device and at each of the displays of the sink devices. More specifically, each of the participating sink devices renders the received media data on its screen and audio equipment.

The Wi-Fi Display (WFD) standard (also known as Miracast™) is an emerging standard for wireless display systems being developed by the Wi-Fi Alliance and based on Wi-Fi Direct, which is a wireless point-to-point protocol that enables wireless connectivity between devices without the use of a wireless access point. The WFD standard provides an interoperable mechanism to discover, pair, connect and render media data sourced from a Wi-Fi Display Source at a Wi-Fi Display Sink.

SUMMARY

In general, the disclosure relates to techniques to enable multiple source devices to transfer transmission rights to a wireless media share session. In certain situations, such as a conference room, a large number of users, each with their own source device, may attempt to share a single sink device for presentation. In such situations, it can be a tedious and time consuming process to disconnect and connect each time a different person wants to present, via their source device, something on the shared sink device. It would be advantageous if the source device could be changed at any time without re-negotiating a media share session with the sink device.

In one example, a method includes during operation of a wireless media share session between a primary source device and a sink device, transferring, from the primary source device to a secondary source device using a wireless link, transmission rights to the media share session with the sink device.

In another example a primary source device includes one or more processors configured to transfer, during operation of a wireless media share session between the primary source device and a sink device and from the primary source device to a secondary source device using a wireless link, transmission rights to the media share session with the sink device.

In another example, a primary source device includes means for operating a wireless media share session between the primary source device and a sink device; and means for transferring, during operation of the wireless media share session and from the primary source device to a secondary source device using a wireless link, transmission rights to the media share session with the sink device.

In another example, a non-transitory computer-readable storage medium stores instructions that, when executed, cause one or more processors of a primary source device to transfer, during operation of a wireless media share session between the primary source device and a sink device and from the primary source device to a secondary source device using a wireless link, transmission rights to the media share session with the sink device.

The details of one or more examples of the invention are set forth in the accompanying drawings and the description below. Other features, objects, and advantages of the invention will be apparent from the description and drawings, and from the claims.

BRIEF DESCRIPTION OF DRAWINGS

FIG. 6 is a flow diagram illustrating example operations of a primary source device to manage the transfer of transmission rights to a media share session, in accordance with one or more techniques of the present disclosure.

DETAILED DESCRIPTION

In some situations, it may be desirable for multiple source devices to share a single sink device. For instance, in a conference room multiple conference participants may wish to output media data from their respective source devices from a single sink device to, for example, facilitate collaboration. However, when switching amongst the source devices, it would not be ideal to require a re-negotiation of the connection with the sink device. For instance, if a sink device and a source device are not already paired, negotiation of a media share session may take around 10 seconds. This disruption may be highly disruptive to the flow of the conference and may hinder collaboration.

Techniques according to the disclosure may enable multiple source devices to transfer transmission rights to a media share session. In some examples, a primary source device may control the transfer of transmission rights among a plurality of source devices. In this way, multiple source devices may seamlessly share a sink device without re-negotiating a media share session. In addition, the techniques of this disclosure may provide the advantage of operating with preexisting Miracast™ sink solutions.

Continuing with the conference room example, a meeting may have a coordinator. The coordinator may operate a device which may be referred to as a primary source device. The device used by the coordinator may function as a Wi-Fi Display Source device that negotiates a Wi-Fi Display session with the sink device. The primary source device may function as a fixed Group owner for a Wi-Fi Direct connection. In some examples, this may be referred to as Autonomous GO mode. The sink device may be invited to join the group and RTSP negotiation may be used to establish a media share session between the primary source device and the sink device. Other attendees of the meeting may also cause their devices, referred to as secondary source devices, to join the group hosted by the primary source device. The secondary source devices may be connected to the primary source using a TCP connection through which requests and responses for transmission rights may be transferred. In accordance with one or more techniques of this disclosure, the primary source device may then facilitate the transfer of the transmission rights amongst the primary source device and the secondary source devices.

Figure 1A:
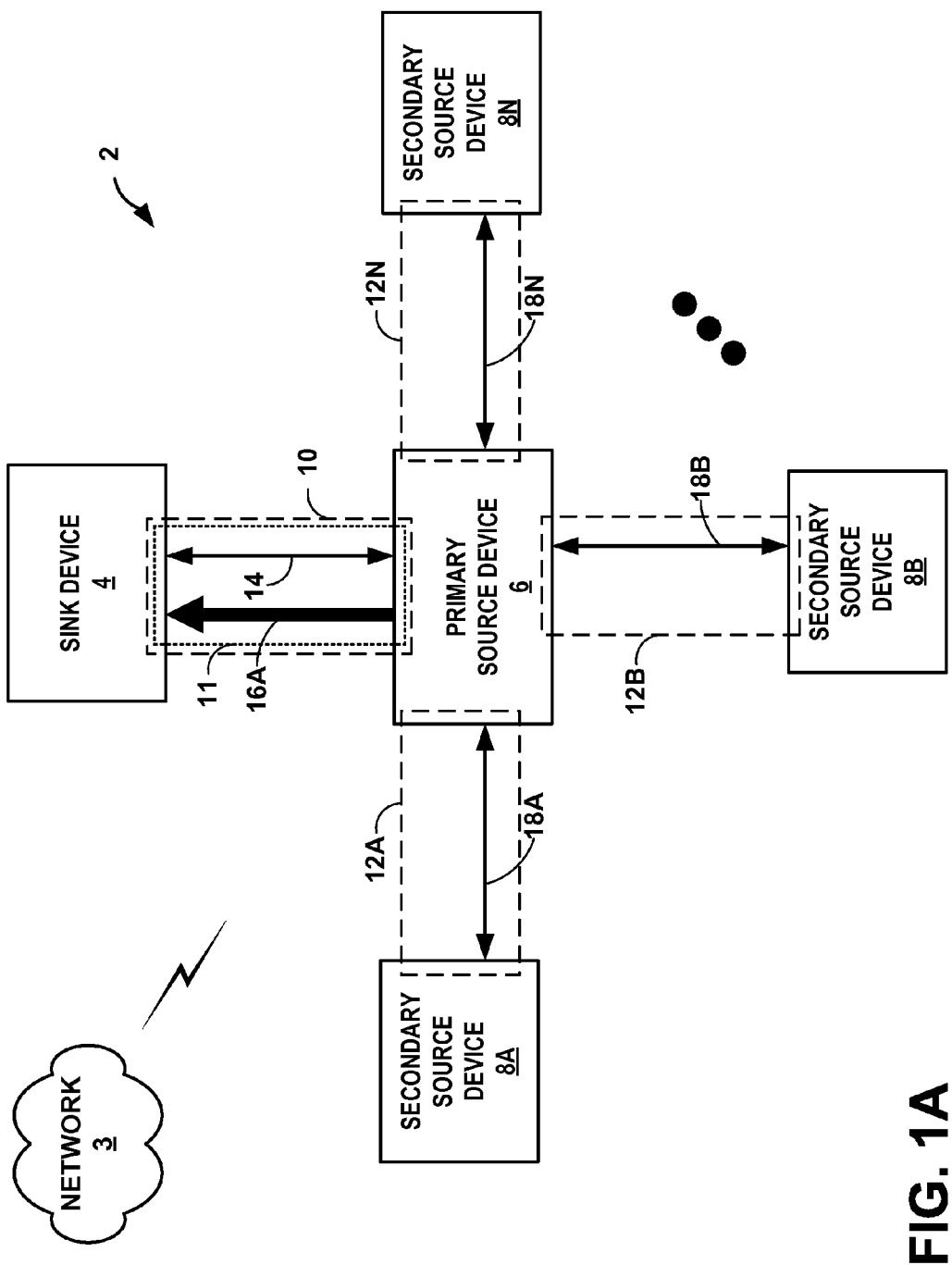
FIGS. 1A and 1B are block diagrams illustrating an example system for managing transmission rights to a media share session, in accordance with one or more techniques of the present disclosure.
Figure 1B:
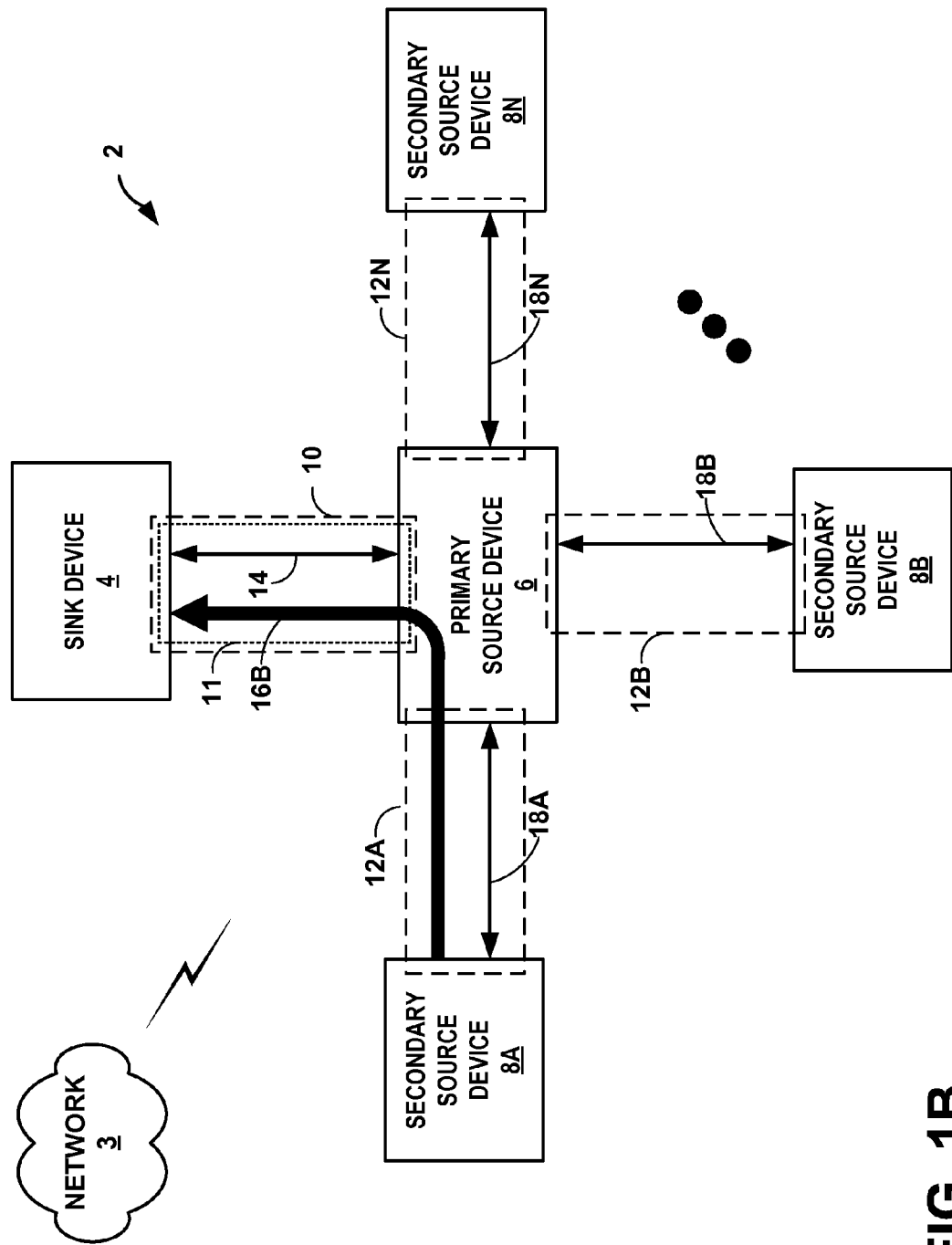

FIGS. 1A and 1B are block diagrams illustrating example system 2 for managing transmission rights to a media share session, in accordance with one or more techniques of the present disclosure. As shown in the example of FIGS. 1A and 1B, system 2 includes sink device 4, primary source device 6, and a plurality of secondary source devices 8A-8N (collectively, "secondary source devices 8"). In this disclosure, primary source device 6 and secondary source devices 8 may be collectively referred to as "source devices". One of more of the source devices may represent a mobile computing device, including but not limited to a mobile phone, a tablet computer, a personal digital assistant, a handheld computer, a media player, and the like, or a combination of two or more of these items. One of more of the source devices may communicate with network 3 by a wireless communication link to, e.g., receive media data, from a server accessible by network 3. In some examples, one or more of the source devices may additionally, or alternatively, represent a standalone source device that sources media data from computer-readable storage media of the source device (not shown in FIG. 1).

Network 3 may represent a mobile network operated by a service provider to provide network access, data transport and other services to a source device, such one or more of the source devices. In general, network 3 may implement a cellular network architecture, such as a General Packet Radio Service (GPRS) architecture, a Universal Mobile Telecommunications System (UMTS) architecture, and an evolution of UMTS referred to as Long Term Evolution (LTE), each of which are standardized by 3rd Generation Partnership Project (3GPP).

Sink device 4 may be configured to receive media data and output the received data using one or more output devices. For instance, sink device 4 may receive video data from one or more of the source devices and output the received video data using a video display. Examples of sink device 4 may include, but are not limited to, mobile telephones, portable computers with wireless communication cards, personal digital assistants (PDAs), portable media players, digital image capturing devices, such as a camera or camcorder, or other flash memory devices with wireless communication capabilities, including so-called "smart" phones and "smart" pads or tablets, televisions, desktop computers, monitors, projectors, printers, audio amplifiers, set top boxes, gaming consoles, routers, dongles, digital video disc (DVD) players, media servers, and the like that include wireless communication capabilities. In some examples, sink device 4 may be a dongle configured to connect to one or more inputs of another device (e.g., a dongle configured to connect to the HDMI port of a television). In some examples, sink device 4 may include primary source device 6. In other words, primary source device 6 may be integral to, or built into, sink device 4.

Primary source device 6 and sink device 4 may establish wireless link 10 according to one or more communication protocols, e.g., Wireless Local Area Network (WLAN), Bluetooth, and/or Wi-Fi Direct. WLAN may conform to a wireless communication standard from the IEEE 802.11 family of standards. In some examples, primary source device 6 and sink device 4 may discover each other and perform a group owner negotiation. For instance, primary source device 6 may use a large group owner intent to become a group owner in a group owner negotiation. In some examples, primary source device 6 may establish a group (e.g., a Wi-Fi Direct group), and invite sink device 4 to join the group. In some examples, primary source device 6 may be referred to as a group owner.

Primary source device 6 and sink device 4 may use wireless link 10 to establish media share session 11. In some examples, media share session 11 may conform to a wireless display (WD) protocol session which enables sink device 4 to operate as a WD sink and enables primary source device 6 to operate as a WD source to source media data 16A to sink device 4. In some examples, primary source device 6 and sink device 4 may use the real time streaming protocol (RTSP) to establish media share session 11. In some examples, media share session 11 may include control channel 14 to, e.g., allow sink device 4 to send data, such as user inputs, to primary source device 6. In some examples, control channel 14 may be a user interface back channel (UIBC). In some instances, media share session 11 may operate over a wireless link in accordance with the corresponding wireless display protocol. In the example of FIG. 1A, primary source device 6 may use media share session 11 to transmit media data 16A to sink device 4 for output at an interface of sink device 4.

Primary source device 6 and one or more of secondary source devices 8 may respectively establish wireless links 12A-12N (collectively, "wireless links 12") according to one or more communication protocols, e.g., Wireless Local Area Network (WLAN), Bluetooth, and/or Wi-Fi Direct. In the example of FIG. 1A, primary source device 6 and secondary source device 8A may establish wireless link 12A. In some examples, one or more of wireless links 12 may conform to a different communication protocol than wireless link 10. In some examples, one or more of wireless links 12 may conform to the same communication protocol as wireless link 10. For instance, wireless link 10 and wireless link 12A may both conform to the Wi-Fi Direct communication protocol. In some examples, such as where primary source device 6 establishes a group, one or more of secondary source devices 8 may join the group. In some examples, one or more of wireless links 12 may respectively include one or more of control channels 18A-18N (collectively, "control channels 18") to, e.g., allow control data to be exchanged between primary source device 6 and one or more of the secondary source devices 8. In some examples, one or more of wireless links 12 may be established prior to the establishment of media share session 11.

In accordance with one or more techniques of this disclosure, primary source device 6 may transfer transmission rights to media share session 11 to one of secondary source devices 8. In some examples, primary source device 6 may transfer the transmission rights during operation of media share session 11. In some examples, primary source device 6 may transfer the transmission rights to a secondary source device in response to receiving a rights request message from the secondary source device. In some examples, primary source device 6 may transfer the transmission rights to a secondary source device in response to receiving a user input from a user of primary source device 6. In some examples, primary source device 6 may transfer the transmission rights by sending a secondary source device a rights granted message. In some examples, the rights granted message may include information that may enable the secondary source device to continue the media share session. In the example of FIG. 1A, primary source device 6 may transfer transmission rights to media share session to secondary source device 8A.

One or more of secondary source devices 8 may, after receiving the transmission rights, utilize media share session 11 to transmit media data 16A to sink device 4 for output at an interface of sink device 4. As illustrated in the example of FIG. 1B, secondary source device 8A may transmit media data 16B to sink device 4, via primary source device 6, for output at an interface of sink device 4. In this way, multiple source devices may alternatively use a sink device without re-negotiating a media share session.

Primary source device 6 may transfer the transmission rights to another of secondary source devices 8 (e.g., a secondary source device 8 that does not have the transmission rights). In some examples, primary source device 6 may send a release rights message to the secondary source device currently in possession of the transmission rights. In the example of FIG. 1B, primary source device 6 may send a rights release message to secondary source device 8A via control channel 18A. Primary source device 6 may receive a rights released message from the secondary source device that is currently transmitting. In some examples, the rights released message may include information which may enable another source device to continue the media share session. In the example of FIG. 1B, primary source device 6 may receive a rights released message from secondary source device 8A. In response to receiving the rights released message, primary source device 6 may transfer the transmission rights to another secondary source device. For instance, in response to receiving a rights released message from secondary source device 8A, primary source device 6 may transfer the transmission rights to secondary source device 8B.

Figure 2A:
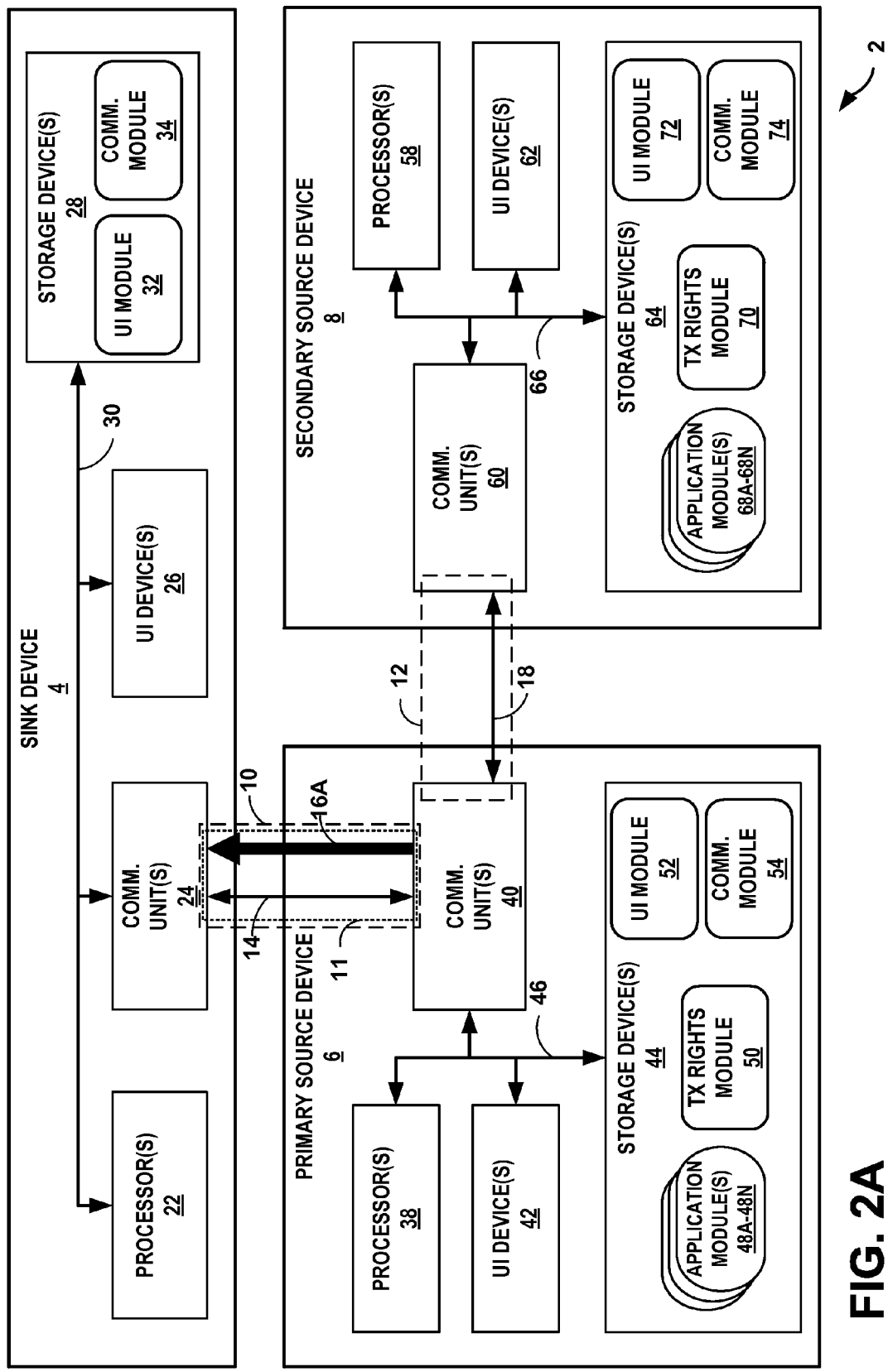
FIGS. 2A and 2B are block diagrams illustrating a primary source device, a secondary source device, and a sink device, in accordance with one or more techniques of the present disclosure.
Figure 2B:
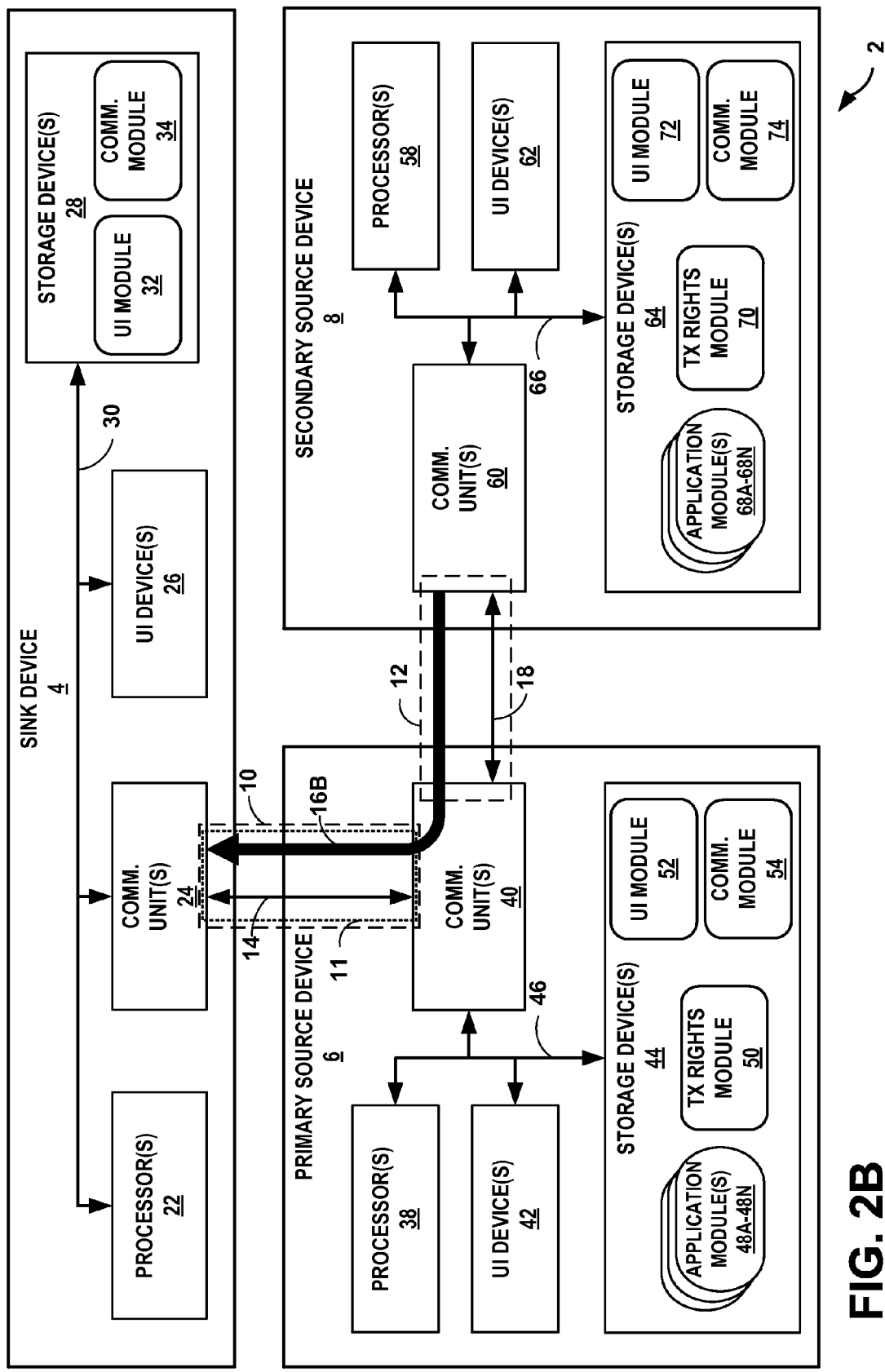

FIGS. 2A and 2B are block diagrams illustrating further details of one example of system 2, in accordance with one or more techniques of the present disclosure. As shown in the example of FIGS. 2A and 2B, system 2 may include sink device 4, primary source device 6, and secondary source device 8.

As illustrated in FIGS. 2A and 2B sink device 4 may include one or more processors 22, one or more communication units 24, one or more user interface (UI) devices 26, and one or more storage devices 28. Each of components 22, 24, 26, and 28 may be interconnected (physically, communicatively, and/or operatively) via communication channels 30 for inter-component communications. In some examples, communication channels 30 may include a system bus, network connection, interprocess communication data structure, or any other channel for communicating data. One or more of storage devices 28, in some examples, may include UI module 32, and communication module 34. UI module 32 and/or communication module 34 may communicate information with one another as well as with other components in sink device 4, such as communication units 24.

Processors 22, in one example, are configured to implement functionality and/or process instructions for execution within sink device 4. For example, processors 22 may be capable of processing instructions stored in one or more of storage devices 28. Examples of processors 22 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Sink device 4, in some examples, also includes ones or more communication units 24. Sink device 4, in one example, utilizes one or more of communication units 24 to communicate with external devices via one or more networks, such as one or more wireless networks. One or more of communication units 24 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, sink device 4 utilizes communication unit 24 to wirelessly communicate with an external device. For instance, sink device 4 may utilize communication unit 24 to wirelessly communicate with primary source device 6 over wireless link 10. In some examples, communication unit 24 may receive input from other components of sink device 4, such as communication module 34, that causes communication unit 24 to wirelessly communicate with an external device, such as communication unit 40 of primary source device 6.

Sink device 4, in some examples, also includes, communication module 34. In some examples, communication module 34 may manage communications between sink device 4 and an external device, such as primary source device 6. For instance, communication module 34 may connect to a network hosted by primary source device 6. In some examples, communication module 34 may exchange data with primary source device 6. As one example, communication module 34 may receive media data from primary source device 6. In some examples, communication module 34 may provide the received information to other components of sink device 4. For example, communication module 34 may provide the received media data to UI module 32.

Sink device 4, in some examples, may also include one or more UI devices 26. In some examples, one or more of UI devices 26 can be configured to output content, such as media data. For instance, one or more of UI devices 26 may be configured to display video data at a display and/or output audio data from speakers. In addition to outputting content, one or more of UI devices 26 may be configured to receive tactile, audio, or visual input. Some examples of UI devices 26 include video displays, speakers, keyboards, touch screens, mice, cameras, and the like.

Sink device 4, in some examples, may also include UI module 32. UI module 32 can perform one or more functions to receive, content, such as media data from other components associated with sink device 4 and cause one or more of UI devices 26 to output the content. In some examples, UI module 32 may be configured to receive an indication of input, such as user input, and send the indications of the input to other components associated with sink device 4, such as one or more of communication modules 34. Using the data, UI module 32 may cause other components associated with sink device 4, such as one or more of UI devices 26, to provide output based on the data.

One or more storage devices 28 may be configured to store information within sink device 4 during operation. One or more of storage devices 28, in some examples, may comprise a computer-readable storage medium. In some examples, one or more of storage devices 28 may comprise a temporary memory, meaning that a primary purpose of one or more of storage devices 28 is not long-term storage. One or more of storage devices 28, in some examples, may comprise a volatile memory, meaning that one or more of storage devices 28 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 28 is used to store program instructions for execution by processors 22. One or more of storage devices 28, in one example, may be used by software or modules running on sink device 4 (e.g., UI module 32, and communication modules 34 to temporarily store information during program execution.

One or more of storage devices 28, in some examples, may also include one or more computer-readable storage media. One or more of storage devices 28 may further be configured for long-term storage of information. In some examples, one or more of storage devices 28 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

As illustrated in FIGS. 2A and 2B primary source device 6 may include one or more processors 38, one or more communication units 40, one or more user interface (UI) devices 42, and one or more storage devices 44. Each of components 38, 40, 42, and 44 may be interconnected (physically, communicatively, and/or operatively) via communication channels 46 for inter-component communications. In some examples, communication channels 46 may include a system bus, network connection, interprocess communication data structure, or any other channel for communicating data. One or more of storage devices 44, in some examples, may include one or more application modules 48A-48N (collectively, "application modules 48"), transmission rights module 50, UI module 52, and communication module 54. Application modules 48, transmission rights module 50, UI module 52, and communication module 54 may communicate information with one another as well as with other components in primary source device 6, such as one or more of communication units 40.

Processors 38, in one example, are configured to implement functionality and/or process instructions for execution within primary source device 6. For example, processors 38 may be capable of processing instructions stored in one or more of storage devices 44. Examples of processors 38 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Primary source device 6, in some examples, also includes ones or more communication units 40. Primary source device 6, in one example, utilizes one or more of communication units 40 to communicate with external devices via one or more networks, such as one or more wireless networks. One or more of communication units 40 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, primary source device 6 utilizes communication unit 40 to wirelessly communicate with one or more external devices. For instance, primary source device 6 may utilize one or more of communication units 40 to wirelessly communicate with sink device 4 over wireless link 10. As another example, primary source device 6 may utilize one or more of communication units 40 to wirelessly communicate with secondary source device 8 over wireless link 12. In some examples, communication unit 40 may receive input from other components of primary source device 6, such as communication module 54, that causes communication unit 40 to wirelessly communicate with one or more external devices, such as communication unit 24 of sink device 4 and/or communication unit 60 of secondary source device 8.

Primary source device 6, in some examples, also includes, communication module 54. In some examples, communication module 54 may manage communications between primary source device 6 and one or more external devices, such as sink device 4 and/or secondary source device 8. For instance, communication module 54 may host one or more wireless networks which may be joined by sink device 4 and/or secondary source device 8. In some examples, communication module 54 may operate as a legacy Wi-Fi hotspot such that other devices that do not support Wi-Fi direct may still join. In some examples, communication module 35 may exchange data with sink device 4 and/or secondary source device 8. As one example, communication module 54 may be configured to negotiate a media share session, such as media share session 11, with sink device 4. For instance, communication module 54 may negotiate video, audio, and/or network settings for a media share session with sink device 4. Some example settings may include a resolution, one or more codecs, and UDP port numbers for use during the media share session. In some examples, communication module 54 may use the real time streaming protocol (RTSP) to negotiate the media share session.

As another example, communication module 54 may send media data to sink device 4. For instance, communication module 54 may send a plurality of packets that include media data to sink device 4. As yet another example, primary source device 6 may receive media data from secondary source device 8 and forward the received data to sink device 4. For instance, primary source device 6 may receive a plurality of packets that include media data from secondary source device 8 and send the received packets to sink device 4. In some examples, communication module 54 may be configured to encapsulate media data in MPEG2-TS format and transport the data over the user datagram protocol (UDP). In some examples, the plurality of packets sent by communication module 54 may be real-time transport protocol (RTP) packets. In some examples, the packets may be formatted according to Table 1 below.

In some examples, the packets may include a header which is further described below with reference to FIG. 3. As shown below in Table 1, the packets may include a continuity counter. In some examples, communication module 54 may increment the value of the continuity counter for each subsequent packet transmitted. For instance, communication module 54 may transmit a second packet with a continuity counter value of 11 following the transmission of a first packet with a continuity counter value of 10. In some examples, the continuity counter value may be referred to as a sequence number.

Also, as shown below in Table 1, the packets may include a PID value. In some examples, communication module 54 may be configured to transmit multiple types of packets (e.g., audio packets, video packets, and packets carrying a program clock reference (PCR) value). Each type of packet may have a unique PID. In some examples, the PID that corresponds to each type of packet may be determined based on one of more specifications (e.g., Miracast™). In some examples, communication module 54 may be configured to transmit a packet including a program clock reference (PCR) value to communication module 34. In some examples, communication module 54 may provide data to other components of primary source device 6. For example, communication module 54 may provide data to transmission rights module 50.

TABLE 1

Example Packet Format

| Syntax | No. of bits | Mnemonic |
|---|---|---|
| transport_packet( ){ | | |
|   sync_byte | 8 | Bslbf |
|   transport_error_indicator | 1 | Bslbf |
|   payload_unit_start_indicator | 1 | Bslbf |
|   transport_priority | 1 | Bslbf |
|   PID | 13 | uimsbf |
|   transport_scrambling_control | 2 | Bslbf |
|   adaptation_field_control | 2 | bslbf |
|   continuity_counter | 4 | uimsbf |
|   if(adaptation_field_control == 10 \|\| | | |
|   adaptation_field_control == 11 ){ | | |
|     adapation_field( ) | | |
|   } | | |
|   if(adaptation_field_control == 01 \|\| | | |
|   adaptation_field_control == 11 ){ | | |
|     for(i=0; i<N; i++){ | | |
|       data_byte | 8 | bslbf |
|     } | | |
|   } | | |
| } | | |

Primary source device 6, in some examples, may also include one or more UI devices 42. In some examples, one or more of UI devices 42 can be configured to output content, such as media data. For instance, one or more of UI devices 42 may be configured to display video data at a display and/or output audio data from speakers. In addition to outputting content, one or more of UI devices 42 may be configured to receive tactile, audio, or visual input. Some examples of UI devices 42 include video displays, speakers, keyboards, touch screens, mice, cameras, and the like.

Primary source device 6, in some examples, may also include UI module 52. UI module 52 can perform one or more functions to receive, content, such as media data from other components associated with primary source device 6 and cause one or more of UI devices 42 to output the content. In some examples, UI module 52 may perform one or more functions to send content, such as media data, to communication module 54. In some examples, UI module 52 may be configured to receive an indication of input, such as user input, and send the indications of the input to other components associated with primary source device 6, such as one or more of communication modules 54 and/or transmission rights module 50. Using the data, UI module 52 may cause other components associated with primary source device 6, such as one or more of UI devices 42, to provide output based on the data.

One or more storage devices 44 may be configured to store information within primary source device 6 during operation. One or more of storage devices 44, in some examples, may comprise a computer-readable storage medium. In some examples, one or more of storage devices 44 may comprise a temporary memory, meaning that a primary purpose of one or more of storage devices 44 is not long-term storage. One or more of storage devices 44, in some examples, may comprise a volatile memory, meaning that one or more of storage devices 44 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 44 is used to store program instructions for execution by processors 38. One or more of storage devices 44, in one example, may be used by software or modules running on primary source device 6 (e.g., application modules 48, transmission rights module 50, UI module 52, and communication module 54) to temporarily store information during program execution.

One or more of storage devices 44, in some examples, may also include one or more computer-readable storage media. One or more of storage devices 44 may further be configured for long-term storage of information. In some examples, one or more of storage devices 44 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Each of application modules 48 may represent an application provided by an entity that manufactures primary source device 6 or software operating on primary source device 6 or an application developed by a third-party for use with primary source device 6. Examples of application modules 48 may include applications for travel routing, maps, audio and/or video presentation, streaming video delivery and presentation, voice and/or calls, weather, etc.

Primary source device 6 may also include transmission rights module 50. In some examples, transmission rights module 50 may be configured to manage transmission rights to a media share session. For instance, transmission rights module 50 may be configured to manage transmission rights to media share session 11 between sink device 4 and primary source device 6. In some examples, transmission rights module 50 may manage the transmission rights by transferring, from primary source device 6 to secondary source device 8, transmission rights to media share session 11. In some examples, transmission rights module 50 may transfer the transmission rights to secondary source device 8 by sending secondary source device 8 a rights granted message. In some examples, the rights granted message may include information needed by secondary source device 8 to begin transmission over media share session 11 without causing a discontinuity in media share session 11. In some examples, transmission rights module 50 may transfer the transmission rights to secondary source device 8 by sending secondary source device 8 a token. In such examples, the possession of the token by a device may indicate that the device has transmission rights. In some examples, transmission rights module 50 may be configured to receive a request for transmission rights from a secondary source device, such as secondary source device 8.

Any of application modules 48, transmission rights module 50, UI module 52, and communication module 54, (collectively, "primary source device modules") may be implemented in various ways. For example, one or more the primary source device modules can be implemented as a downloadable or pre-installed application or "app." In another example, one or more of the primary source device modules can be implemented as part of a hardware unit of primary source device 6. In another example, one or more of the primary source device modules can be implemented as part of an operating system of primary source device 6.

As illustrated in FIGS. 2A and 2B secondary source device 8 may include one or more processors 58, one or more communication units 60, one or more user interface (UI) devices 62, and one or more storage devices 64. Each of components 58, 60, 62, and 64 may be interconnected (physically, communicatively, and/or operatively) via communication channels 66 for inter-component communications. In some examples, communication channels 66 may include a system bus, network connection, interprocess communication data structure, or any other channel for communicating data. One or more of storage devices 64, in some examples, may include one or more application modules 68A-68N (collectively, "application modules 68"), transmission rights module 70, UI module 72, and communication module 74. Application modules 68, transmission rights module 70, UI module 72, and communication module 74 may communicate information with one another as well as with other components in secondary source device 8, such as one or more of communication units 60.

Processors 58, in one example, are configured to implement functionality and/or process instructions for execution within secondary source device 8. For example, processors 58 may be capable of processing instructions stored in one or more of storage devices 64. Examples of processors 58 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Secondary source device 8, in some examples, also includes ones or more communication units 60. Secondary source device 8, in one example, utilizes one or more of communication units 60 to communicate with external devices via one or more networks, such as one or more wireless networks. One or more of communication units 60 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, secondary source device 8 utilizes one or more of communication units 60 to wirelessly communicate with one or more external devices. For instance, secondary source device 8 may utilize one or more of communication units 60 to wirelessly communicate with primary source device 6 over wireless link 12. In some examples, communication unit 60 may receive input from other components of secondary source device 8, such as communication module 74, that causes communication unit 60 to wirelessly communicate with one or more external devices, such as communication unit 40 of primary source device 6.

Secondary source device 8, in some examples, also includes, communication module 74. In some examples, communication module 74 may manage communications between secondary source device 8 and one or more external devices, such as primary source device 6. For instance, communication module 74 may connect to a network hosted by primary source device 6. In some examples, communication module 74 may exchange data with primary source device 6 and or sink device 4. As one example, communication module 74 may send media data to primary source device 6. For instance, communication module 74 may send a plurality of packets that include media data to primary source device 6 for forwarding to sink device 4. In some examples, the packets of media data sent by communication module 74 may be similar to the packets of media data sent by communication module 54 of primary source device 6 (i.e., RTP packets). In some examples, communication module 74 may provide received data to other components of secondary source device 8. For example, communication module 74 may provide the received data to transmission rights module 70.

Secondary source device 8, in some examples, may also include one or more UI devices 62. In some examples, one or more of UI devices 62 can be configured to output content, such as media data. For instance, one or more of UI devices 62 may be configured to display video data at a display and/or output audio data from speakers. In addition to outputting content, one or more of UI devices 62 may be configured to receive tactile, audio, or visual input. Some examples of UI devices 62 include video displays, speakers, keyboards, touch screens, mice, cameras, and the like.

Secondary source device 8, in some examples, may also include UI module 72. UI module 72 can perform one or more functions to receive, content, such as media data from other components associated with secondary source device 8 and cause one or more of UI devices 62 to output the content. In some examples, UI module 72 may be configured to receive an indication of input, such as user input, and send the indications of the input to other components associated with secondary source device 8, such as one or more of communication modules 74 and/or transmission rights module 70. Using the data, UI module 72 may cause other components associated with secondary source device 8, such as one or more of UI devices 62, to provide output based on the data.

One or more storage devices 64 may be configured to store information within secondary source device 8 during operation. One or more of storage devices 64, in some examples, may comprise a computer-readable storage medium. In some examples, one or more of storage devices 64 may comprise a temporary memory, meaning that a primary purpose of one or more of storage devices 64 is not long-term storage. One or more of storage devices 64, in some examples, may comprise a volatile memory, meaning that one or more of storage devices 64 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 64 is used to store program instructions for execution by processors 58. One or more of storage devices 64, in one example, may be used by software or modules running on secondary source device 8 (e.g., application modules 68, transmission rights module 70, UI module 72, and communication module 74) to temporarily store information during program execution.

One or more of storage devices 64, in some examples, may also include one or more computer-readable storage media. One or more of storage devices 64 may further be configured for long-term storage of information. In some examples, one or more of storage devices 64 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Each of application modules 68 may represent an application provided by an entity that manufactures secondary source device 8 or software operating on secondary source device 8 or an application developed by a third-party for use with secondary source device 8. Examples of application modules 68 may include applications for travel routing, maps, audio and/or video presentation, streaming video delivery and presentation, voice and/or calls, weather, etc.

Secondary source device 8 may also include transmission rights module 70. In some examples, transmission rights module 70 may be configured to manage transmission rights to a media share session. For instance, transmission rights module 70 may be configured to exchange (send and receive) transmission rights to media share session 11. In some examples, transmission rights module 70 may exchange the transmission rights with transmission rights module 50 of primary source device 6. In some examples, transmission rights module 70 may exchange the transmission rights with a transmission rights module of another secondary source device.

Any of application modules 68, transmission rights module 70, UI module 72, and communication module 74, (collectively, "secondary source device modules") may be implemented in various ways. For example, one or more of the secondary source device modules can be implemented as a downloadable or pre-installed application or "app." In another example, one or more of the secondary source device modules can be implemented as part of a hardware unit of secondary source device 8. In another example, one or more of the secondary source device modules can be implemented as part of an operating system of secondary source device 8.

In accordance with one of more techniques of this disclosure and as illustrated in FIG. 2A, communication module 54 of primary source device 6 may establish a group. For instance, communication module 54 may establish a Wi-Fi Direct group. In some examples, primary source device 6 may be referred to as the owner of the group. Following the establishment of the group, communication module 54 may allow other devices to join the group.

Communication module 34 of sink device 4 may utilize wireless link 10 to discover primary source device 6 and join the group hosted by communication module 54 of primary source device 6. In some examples, communication module 34 may join the group in response to an invitation received from primary source device 6. In some examples, communication module 34 may join the group in response to user input received by UI module 32. In some examples, communication module 34 may be assigned an internet protocol (IP) address by communication module 54. In some examples, communication module 34 may receive a clock synchronization signal from communication module 54. In this way, primary source device 6 and sink device 4 may be synchronized to the same clock.

After sink device 4 joins the group, primary source device 6 may negotiate media share session 11 with sink device 4. In some examples, primary source device 6 may negotiate media share session 11 with sink device 4 by exchanging messages with sink device 4 until certain parameters are agreed upon. Some example parameters may include a video resolution, one of more codecs, a UDP port number, a frame rate, an audio sampling rate, and/or a number of channels. In some examples, transmission rights to media share session 11 may initially be assigned to primary source device 6. In other words, the initial right to transmit data may reside with primary source device 6.

Following negotiation, primary source device 6 may use media share session 11 to begin transmission of media data 16A to sink device 4. In other words, primary source device 6 may begin to stream media data to sink device 4. For example, communication module 54 may begin to send packets including the media data to the agreed upon UDP port of communication module 34. In some examples, communication module 54 may encapsulate the media data into MPEG2-TS format and transport the media data to communication module 34 as RTP packets. In some examples, each of the packets sent may include a respective sequence number.

Sink device 4 may receive the media data and output the media data at one or more interfaces. For example, communication module 34 may receive the packets at the agreed upon UDP port and provide the media data to UI module 32. UI module 32 may then cause one or more of UI devices 26 to output the media data. For instance, a video display of UI devices 26 may output a video component of the media data and one or more speakers of UI device 26 may output an audio component of the media data.

Communication module 74 of secondary source device 8 may utilize wireless link 12 to discover primary source device 6 and join the group hosted by communication module 54 of primary source device 6. In some examples, communication module 74 may join the group in response to an invitation received from primary source device 6. In some examples, communication module 74 may join the group in response to user input received by UI module 72. In some examples, communication module 74 may be assigned an internet protocol (IP) address by communication module 54. In some examples, communication module 74 may receive a clock synchronization signal from communication module 54. In this way, primary source device 6 and secondary source device 8 may be synchronized to the same clock.

During operation of media share session 11, transmission rights module 50 of primary source device 6 may transfer transmission rights to media share session 11 to transmission rights module 70 of secondary source device 8. In some examples, transmission rights module 50 may transfer the transmission rights by causing one of more of communication units 40 to send, via control channel 18, a rights granted message to transmission rights module 70. In some examples, communication module 54 may send a final packet that includes a final sequence number to communication module 34. In some examples, the rights granted message may include one or more values that enable secondary source device 8 to continue using the same media share session. For instance, the rights granted message may include a value that corresponds to the value of the final sequence number, a program clock reference value, a PID value, the IP address assigned to sink device 4, and/or one or more of the negotiated parameters (e.g., the RTP port at sink device 4, the codecs, the video resolution, the frame rate, the audio sampling rate, and/or an number of channels).

In some examples, the rights granted message may include a value equivalent to the value of the final sequence number. In some examples, after sending the final packet, communication module 54 may stop transmitting packets that include media data generated by primary source device 6 to sink device 4. In some examples, transmission rights module 50 may transfer the transmission rights to secondary source device 8 in response to receiving a rights request message from secondary source device 8. In some examples, the transmission rights to media share session 11 may be unmoderated (i.e., on demand). For instance, transmission rights module 50 may not seek user approval prior to transferring the transmission rights. In some examples, the transmission rights to media share session 11 may be moderated. For instance, transmission rights module 50 may seek user approval prior to transferring the transmission rights. As one example, transmission rights module 50 may cause UI module 52 to output a graphical user interface requesting approval of the transfer and UI module 52 may provide a received approval or disapproval to transmission rights module 50. In some examples, the mode of exchange (i.e., moderated or unmoderated) may be selected by receiving user input from UI module 52. In some examples, the mode of exchange may be a default set by transmission rights module 50.

As illustrated in FIG. 2B, transmission rights module 70 of secondary source device 8 may receive the transmission rights. In some examples, in response to receiving the transmission rights, transmission rights module 70 may allow communication module 74 to begin using media share session 11 to transmit media data 16B to sink device 4. In other words, secondary source device 8 may begin to stream media data to sink device 4. In some examples, communication module 74 may transmit the media data 16B to sink device 4 by sending packets including media data 16B over wireless link 12 to communication module 54 of primary source device 6.

Primary source device 6 may receive the media data from secondary source device 8 and forward the received media data to sink device 4. For example, communication module 54 may receive packets including the media data from communication module 74 and forward the received packets to the agreed upon UDP port of communication module 34.

Sink device 4 may receive the media data and output the media data at one or more interfaces. For example, communication module 34 may receive the packets at the agreed upon UDP port and provide the media data to UI module 32. UI module 32 may then cause one or more of UI devices 26 to output the media data. For instance, a video display of UI devices 26 may output a video component of the media data and one or more speakers of UI device 26 may output an audio component of the media data. In this way, secondary source device 8 may cause sink device 4 to output media data generated by secondary source device 8 without renegotiating media share session 11 or negotiating a different media share session.

Figure 3:
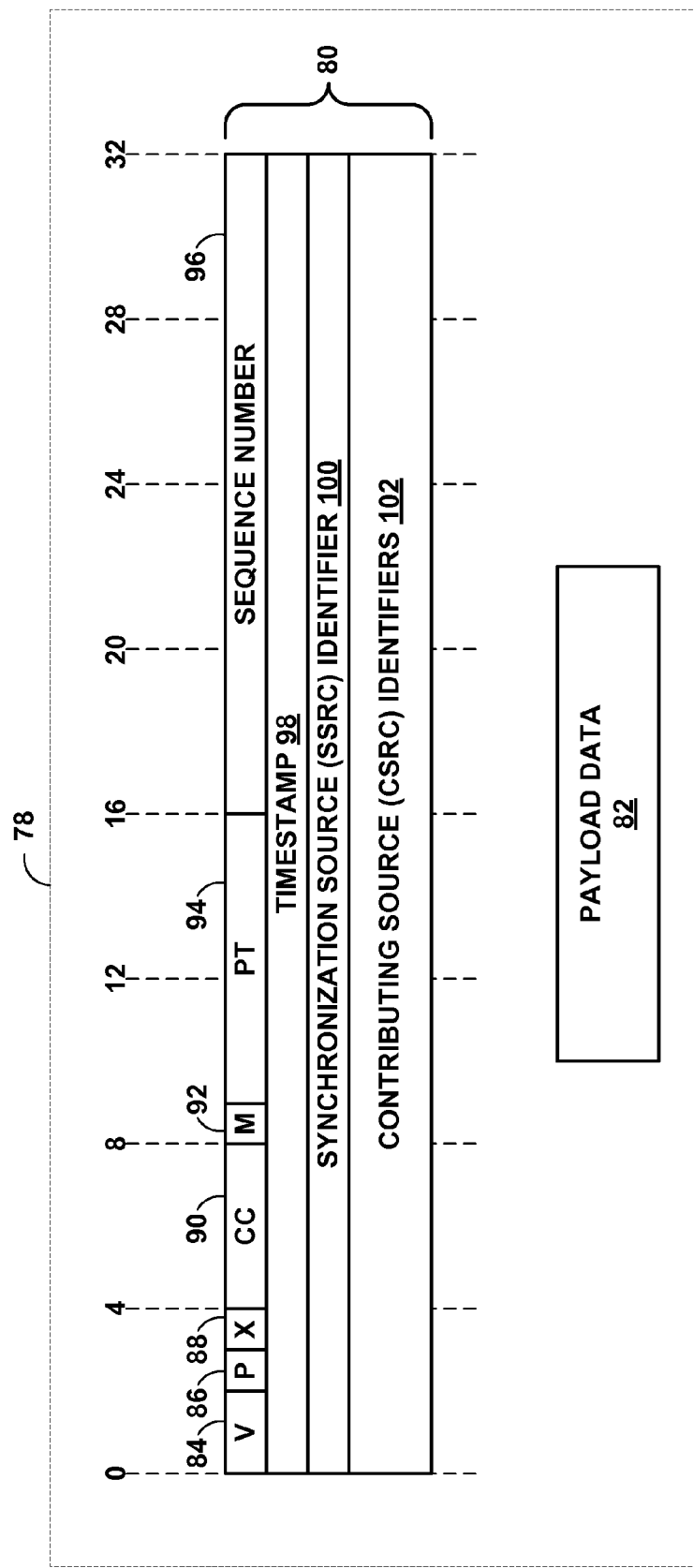
FIG. 3 is a block diagram illustrating an example data structure format for a media share session, in accordance with one or more techniques of the present disclosure.

FIG. 3 is a block diagram illustrating an example packet used for transporting media data in a media share session, in accordance with one or more techniques of the present disclosure. As shown in the example of FIG. 3, packet 78 includes packet header 80 and payload data 82. In some examples, packet 78 may be a RTP packet.

In this example, packet header 80 may include a first 32-bit word that specifies a version (V) 84, padding (P) 86, extension (X) 88, CSRC count (CC) 90, marker (M) 92, payload type (PT) 94, and sequence number 96. In addition, packet header 80 may specify a timestamp 98, a synchronization source identifier (SSRC) 100, and one or more contributing source identifiers (CSRC) 102.

V 84 may indicate a version of a protocol to which a media share session, such as media share session 11 of FIGS. 1A and 1B, may conform. P 86 may indicate whether there are extra padding bytes at the end of packet 78. X 88 may indicate the presence of an extension header between header 80 and payload data 82. CC 90 may indicate a quantity of CSRC identifiers included in CSRC 102. M 92 may indicate whether packet 78 has some special relevance to an application. PT 94 may indicate a format of payload data 82. Sequence number 96 may indicate a value of a sequence number of packet 78. In some examples, sequence number 96 may be a 16 bit counter. In some examples, sequence number 96 may be incremented for each subsequent packet.

Timestamp 98 may indicate a time at which packet 78 was created. SSRC 100 may be a unique identifier that indicates the source of packet 78. CSRC 102 may indicate the identifiers of one or more sources that contribute to a stream that includes packet 78.

In accordance with one or more techniques of this disclosure, a source device may send a plurality of packets 78 to a sink device. During operation of a media share session between a primary source device and a sink device, the primary source device may transfer transmission rights to the media share session to a secondary source device. The secondary source device may then send a plurality of packets 78 to the sink device via the primary source device. In some examples, the packets 78 transmitted by primary source device and the packets 78 transmitted by the secondary source device may have identical values for SSRC 100. In some examples, the primary source device and the secondary source device may be synchronized to the same clock. In this way, the values of timestamp 98 of the packets transmitted by the primary source device may be continuous (i.e., synchronized) with the values of timestamp 96 of the packets transmitted by the secondary source device. In some examples, when the transmission rights are transferred, the value of timestamp 96, sequence number 96, and/or SSRC 100 may be communicated to the source device that is receiving the transmission rights. In this way, the recipient of the transmission right may continue to use the same media share session.

Figure 4:
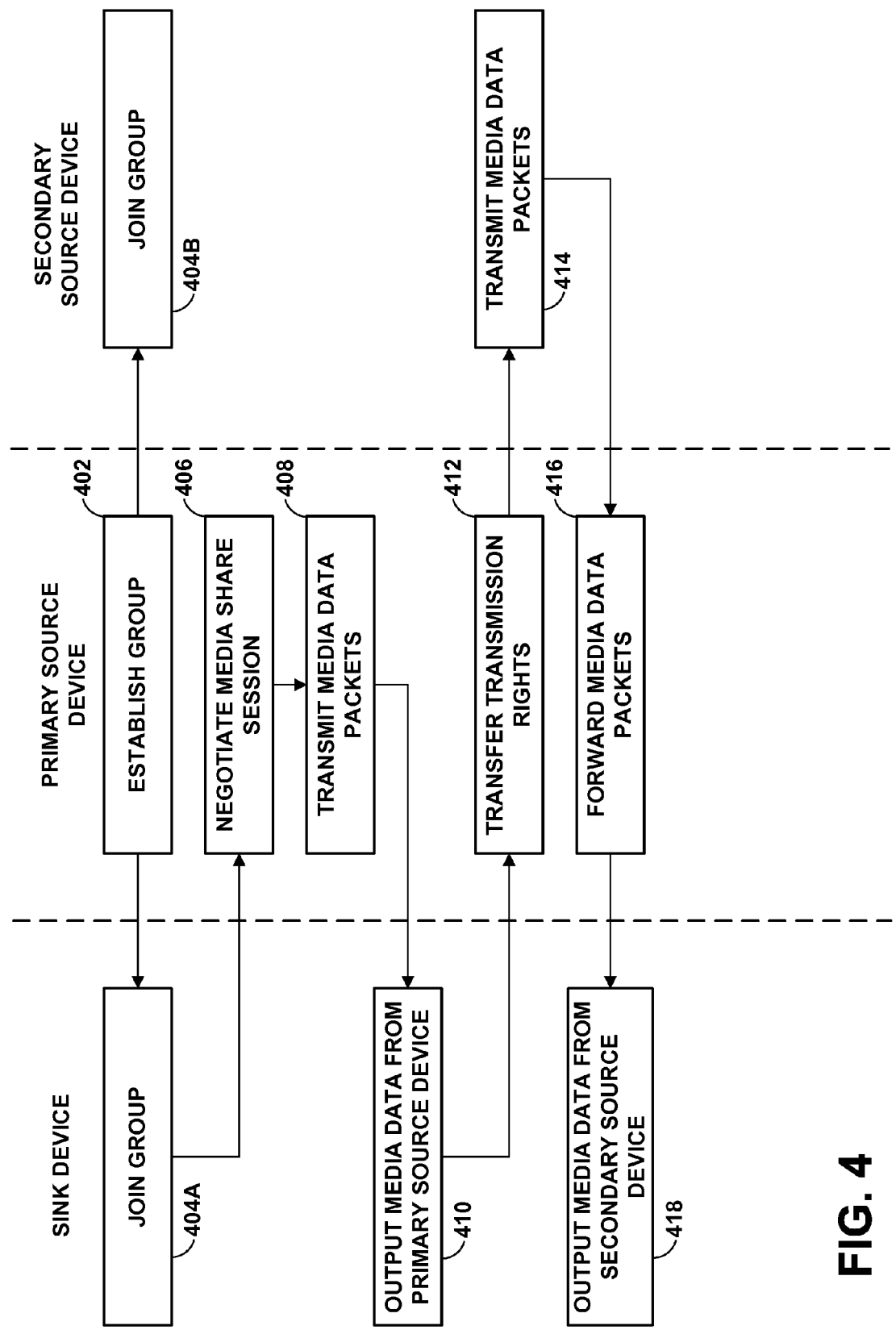
FIG. 4 is a flow diagram illustrating example operations of a system to manage the transfer of transmission rights to a media share session, in accordance with one or more techniques of the present disclosure.

FIG. 4 is a flow diagram illustrating example operations of a system to manage the transfer of transmission rights to a media share session, in accordance with one or more techniques of the present disclosure. For purposes of illustration, the techniques of FIG. 4 are described within the context of sink device 4, primary source device 6, and secondary source device 8 of FIGS. 1A, 1B, 2A, and 2B, although source devices having configurations different than that of primary source device 6 may perform the techniques of FIG. 4.

Figure 5:
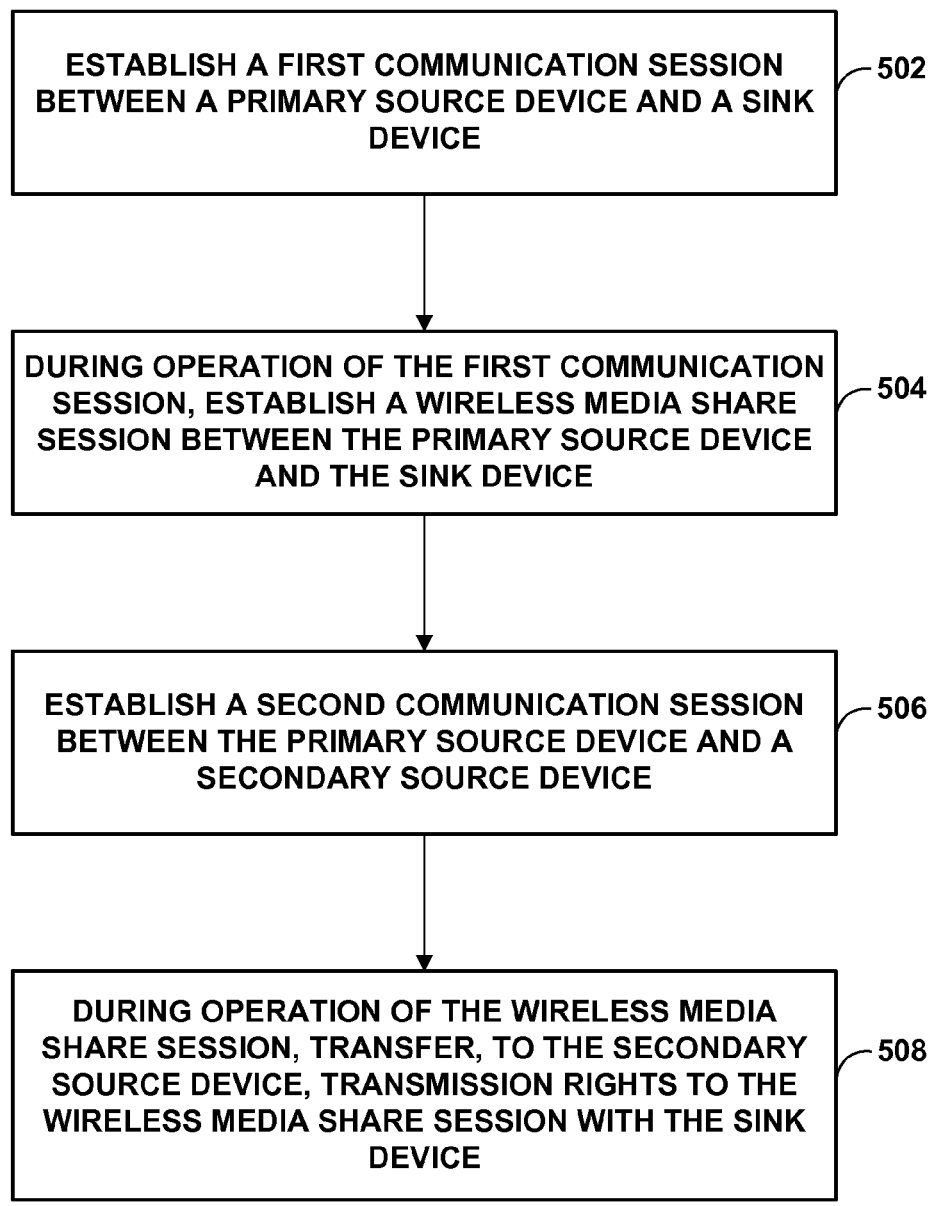
FIG. 5 is a flow diagram illustrating example operations of a primary source device to manage the transfer of transmission rights to a media share session, in accordance with one or more techniques of the present disclosure.

FIG. 5 is a flow diagram illustrating example operations of a primary source device to manage the transfer of transmission rights to a media share session, in accordance with one or more techniques of the present disclosure. For purposes of illustration, the techniques of FIG. 5 are described within the context of primary source device 6 of FIGS. 1A, 1B, 2A, and 2B, although source devices having configurations different than that of primary source device 6 may perform the techniques of FIG. 5.

In accordance with one or more techniques of this disclosure, primary source device 6 may establish a first communication session between primary source device 6 and a sink device (502). During operation of the first communication session, primary source device 6 may establish a wireless media share session between primary source device 6 and the sink device (504). Primary source device 6 may establish a second communication session between primary source device 6 and a secondary source device (506). During operation of the wireless media share session, primary source device 6 may transfer, to the secondary source device, transmission rights to the wireless media share session with the sink device (508). In this way, primary source device 6 and one or more secondary source devices may share a source device without each source device negotiating a media share session.

FIG. 6 is a flow diagram illustrating example operations of a primary source device to manage the transfer of transmission rights to a media share session, in accordance with one or more techniques of the present disclosure. For purposes of illustration, the techniques of FIG. 6 are described within the context of primary source device 6 of FIGS. 1A, 1B, 2A, and 2B, secondary source device 8A of FIG. 1A and FIG. 1B, and secondary source device 8B of FIG. 1A and FIG. 1B, although source devices having configurations different than that of primary source device 6, secondary source device 8A, and secondary source device 8B may perform the techniques of FIG. 6.

In accordance with one or more techniques of this disclosure, primary source device 6 may establish a first communication session between primary source device 6 and a sink device (602). During operation of the first communication session, primary source device 6 may establish a wireless media share session between primary source device 6 and the sink device (604). Primary source device 6 may establish a second communication session between primary source device 6 and first secondary source device 8A (606). Primary source device 6 may establish a third communication session between primary source device 6 and second secondary source device 8B (608). During operation of the wireless media share session, primary source device 6 may transfer, to second secondary source device 8B, transmission rights to the wireless media share session with the sink device (610).

Primary source device 6 may receive, from first secondary source device 8A, a rights request communication (612). Primary source device 6 may determine that second secondary source device 8B has the transmission rights (614). Primary source device 6 may then send, to second secondary source device 8B, a release rights communication (616). Primary source device 6 may receive, from second secondary source device 8B, a rights released communication (618). Primary source device 6 may then transfer, to first secondary source device 8A, the transmission rights to the wireless media share session with the sink device (620). In this way, primary source device 6 and one or more secondary source devices may share a source device without each source device negotiating a media share session.

Example 1

A method comprising: during operation of a wireless media share session between a primary source device and a sink device, transferring, from the primary source device to a secondary source device using a wireless link, transmission rights to the media share session with the sink device.

Example 2

The method of any example 1, further comprising: transmitting, by the primary source device to the sink device, media data generated by the primary source device for output at an interface of the sink device.

Example 3

The method of any of examples 1-2, wherein transmitting the media data to the sink device comprises transmitting a plurality of packets, wherein each packet of the plurality of packets includes a respective sequence number, wherein transferring transmission rights comprises: transmitting, by the primary source device to the sink device, a final packet that includes a final sequence number; and transmitting, by the primary source device to the secondary source device, a rights granted communication comprising a sequence number value, wherein the sequence number value corresponds to a value of the final sequence number.

Example 4

The method of any of examples 1-3, further comprising: receiving, by the primary source device from the secondary source device, a first packet including a first sequence number, wherein the first sequence number is equivalent to the final sequence number plus one; and transmitting, by the primary source device, the packet received from the secondary source device to the sink device for output at the interface of the sink device.

Example 5

The method of any of examples 1-4, further comprising: receiving, by the primary source device from the secondary source device, a rights request communication, wherein the transmission rights are transferred from the primary source device to the secondary source device in response to receiving the rights request communication.

Example 6

The method of any of examples 1-5, wherein the secondary source device is a first secondary source device, the method further comprising: determining, by the primary source device, that a second secondary source device has the transmission rights; transmitting, by the primary source device and to the second secondary source device, a release rights communication; receiving, by the primary source device and from the second secondary source device, a final packet that includes a final sequence number; and receiving, by the primary source device and from the second secondary source device, a rights released communication, wherein the transmission rights are transferred from the primary source device to the first secondary source device in response to receiving the rights released communication, and wherein transferring, by the primary source device to the first secondary source device, the transmission rights comprises: transmitting, by the primary source device to the first secondary source device, a rights granted communication comprising a sequence number value, wherein the sequence number value corresponds to a value of the final sequence number.

Example 7

The method of any of examples 1-6, further comprising: establishing, by the primary source device, a group, wherein the primary source device is a group owner, and wherein the secondary source device is a group member.

Example 8

The method of any of examples 1-7, further comprising: synchronizing a clock of the primary source device with a clock of the secondary source device.

Example 9

A primary source device comprising one or more processors configured to: transfer, during operation of a wireless media share session between the primary source device and a sink device and from the primary source device to a secondary source device using a wireless link, transmission rights to the media share session with the sink device.

Example 10

The device of example 9, wherein the one or more processors are further configured to: transmit, to the sink device, media data generated by the primary source device for output at an interface of the sink device.

Example 11

The device of any of examples 9-10, wherein the one or more processors are configured to transmit the media data to the sink device by transmitting a plurality of packets, wherein each packet of the plurality of packets includes a respective sequence number, and wherein the one or more processors are configured to transfer transmission rights by: transmitting, to the sink device, a final packet that includes a final sequence number; and transmitting, to the secondary source device, a rights granted communication comprising a sequence number value, wherein the sequence number value corresponds to a value of the final sequence number.

Example 12

The device of any of examples 9-11, wherein the one or more processors are further configured to: receive, from the secondary source device, a first packet including a first sequence number, wherein the first sequence number is equivalent to the final sequence number plus one; and transmit the packet received from the secondary source device to the sink device for output at the interface of the sink device.

Example 13

The device of any of examples 9-12, wherein the one or more processors are further configured to: receive, from the secondary source device, a rights request communication, wherein the transmission rights are transferred from the primary source device to the secondary source device in response to receiving the rights request communication.

Example 14

The device of any of examples 9-13, wherein the secondary source device is a first secondary source device, and wherein the one or more processors are further configured to: determine that a second secondary source device has the transmission rights; transmit, to the second secondary source device, a release rights communication; receive, from the second secondary source device, a final packet that includes a final sequence number; and receive, from the second secondary source device, a rights released communication, wherein the transmission rights are transferred from the primary source device to the first secondary source device in response to receiving the rights released communication, and wherein the one or more processors are configured to transfer the transmission rights to the first secondary source device by at least: transmitting, to the first secondary source device, a rights granted communication comprising a sequence number value, wherein the sequence number value corresponds to a value of the final sequence number.

Example 15

The device of any of examples 9-14, wherein the one or more processors are further configured to: establish a group, wherein the primary source device is a group owner, and wherein the secondary source device is a group member.

Example 16

The device of any of examples 9-15, wherein the one or more processors are further configured to: synchronize a clock of the primary source device with a clock of the secondary source device.

Example 17

A primary source device comprising: means for operating a wireless media share session between the primary source device and a sink device; and means for transferring, during operation of the wireless media share session and from the primary source device to a secondary source device using a wireless link, transmission rights to the media share session with the sink device.

Example 18

The device of example 17, further comprising: means for transmitting, to the sink device, media data generated by the primary source device for output at an interface of the sink device.

Example 19

The device of any of examples 17-18, wherein the means for transmitting the media data to the sink device comprises means for transmitting a plurality of packets, wherein each packet of the plurality of packets includes a respective sequence number, wherein the means for transferring transmission rights comprises: means for transmitting, to the sink device, a final packet that includes a final sequence number; and means for transmitting, to the secondary source device, a rights granted communication comprising a sequence number value, wherein the sequence number value corresponds to a value of the final sequence number.

Example 20

The device of any of examples 17-19, further comprising: means for receiving, from the secondary source device, a first packet including a first sequence number, wherein the first sequence number is equivalent to the final sequence number plus one; and means for transmitting the packet received from the secondary source device to the sink device for output at the interface of the sink device.

Example 21

The device of any of examples 17-20, further comprising: means for receiving, from the secondary source device, a rights request communication, wherein the transmission rights are transferred from the primary source device to the secondary source device in response to receiving the rights request communication.

Example 22

The device of any of examples 17-21, wherein the secondary source device is a first secondary source device, the device further comprising: means for determining that a second secondary source device has the transmission rights; means for sending, to the second secondary source device, a release rights communication; means for receiving, from the secondary source device, a final packet that includes a final sequence number; and means for receiving, from the second secondary source device, a rights released communication, wherein the transmission rights are transferred from the primary source device to the first secondary source device in response to receiving the rights released communication, and wherein the means for transferring the transmission rights comprise: means for transmitting, to the first secondary source device, a rights granted communication comprising a sequence number value, wherein the sequence number value corresponds to a value of the final sequence number.

Example 23

The device of any of examples 17-22, further comprising: means for establishing, by the primary source device, a group, wherein the primary source device is a group owner, and wherein the secondary source device is a group member.

Example 24

A non-transitory computer-readable storage medium storing instructions that, when executed, cause one or more processors of a primary source device to: transfer, during operation of a wireless media share session between the primary source device and a sink device and from the primary source device to a secondary source device using a wireless link, transmission rights to the media share session with the sink device.

Example 25

The non-transitory computer-readable storage medium of example 24, further comprising instructions that, when executed, cause the one or more processors to: transmit, to the sink device, media data generated by the primary source device for output at an interface of the sink device.

Example 26

The non-transitory computer-readable storage medium of any of examples 24-25, wherein the instructions that cause the one or more processors to transmit the media data to the sink device comprise instructions that cause the one or more processors to transmit a plurality of packets, wherein each packet of the plurality of packets includes a respective sequence number, wherein the instructions that cause the one or more processors to transfer transmission rights comprise instructions that cause the one or more processors to: transmit, to the sink device, a final packet that includes a final sequence number; and transmit, to the secondary source device, a rights granted communication comprising a sequence number value, wherein the sequence number value corresponds to a value of the final sequence number.

Example 27

The non-transitory computer-readable storage medium of any of examples 24-26, further comprising instructions that, when executed, cause the one or more processors to: receive, from the secondary source device, a first packet including a first sequence number, wherein the first sequence number is equivalent to the final sequence number plus one; and transmit the packet received from the secondary source device to the sink device for output at the interface of the sink device.

Example 28

The non-transitory computer-readable storage medium of any of examples 24-27, further comprising instructions that, when executed, cause the one or more processors to: receive, from the secondary source device, a rights request communication, wherein the instructions that cause the one or more processors to transfer the transmission rights from the primary source device to the secondary source device comprise instructions that cause the one or more processors to transfer the transmission rights from the primary source device to the secondary source device in response to receiving the rights request communication.

Example 29

The non-transitory computer-readable storage medium of any of examples 24-28, wherein the secondary source device is a first secondary source device, and wherein the non-transitory computer-readable further comprises instructions that, when executed, cause the one or more processors to: determine that a second secondary source device has the transmission rights; transmit, to the second secondary source device, a release rights communication; receive, from the second secondary source device, a final packet that includes a final sequence number; and receive, from the second secondary source device, a rights released communication, wherein the transmission rights are transferred from the primary source device to the first secondary source device in response to receiving the rights released communication, and wherein the instructions that cause the one or more processors to transfer the transmission rights to the first secondary source device comprise instructions that cause the one or more processors to: transmit, to the first secondary source device, a rights granted communication comprising a sequence number value, wherein the sequence number value corresponds to a value of the final sequence number.

Example 30

The non-transitory computer-readable storage medium of any of examples 24-29, further comprising instructions that, when executed, cause the one or more processors to: establish a group, wherein the primary source device is a group owner, and wherein the secondary source device is a group member.

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-multimedia applications and devices. In some aspects, for example, such components may form part of a mobile device, such as a wireless communication device handset (e.g., a mobile telephone handset).

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various examples of the invention have been described. These and other examples are within the scope of the following claims.

The invention claimed is:

1. A method comprising:
    transmitting, by a primary source device to a sink device and via a media share session between the primary source device and the sink device, a plurality of packets containing media data generated by the primary source device for output at an interface of the sink device, wherein each packet of the plurality of packets includes a respective sequence number;
    during operation of the wireless media share session, transferring, from the primary source device to a secondary source device using a wireless link, transmission rights to the media share session with the sink device, wherein transferring the transmission rights comprises:
        transmitting, by the primary source device to the sink device, a final packet that includes a final sequence number; and
        transmitting, by the primary source device to the secondary source device, a rights granted communication comprising a sequence number value, wherein the sequence number value corresponds to a value of the final sequence number; and
    forwarding, by the primary source device to the sink device and via the media share session, a plurality of packets containing media data generated by the secondary source device for output at the interface of the sink device, wherein forwarding the plurality of packets comprises:
        receiving, by the primary source device from the secondary source device, a first packet including a first sequence number, wherein the first sequence number is equivalent to the final sequence number plus one; and
        transmitting, by the primary source device, the packet received from the secondary source device to the sink device for output at the interface of the sink device.

2. The method of claim 1, further comprising:
    receiving, by the primary source device from the secondary source device, a rights request communication,
    wherein the transmission rights are transferred from the primary source device to the secondary source device in response to receiving the rights request communication.

3. The method of claim 2, wherein the secondary source device is a first secondary source device, the method further comprising:
    determining, by the primary source device, that a second secondary source device has the transmission rights;
    transmitting, by the primary source device and to the second secondary source device, a release rights communication;
    receiving, by the primary source device and from the second secondary source device, a final packet that includes a final sequence number; and
    receiving, by the primary source device and from the second secondary source device, a rights released communication,
    wherein the transmission rights are transferred from the primary source device to the first secondary source device in response to receiving the rights released communication, and wherein transferring, by the primary source device to the first secondary source device, the transmission rights comprises:
        transmitting, by the primary source device to the first secondary source device, a rights granted communication comprising a sequence number value, wherein the sequence number value corresponds to a value of the final sequence number included in the final packet received from the second secondary source device.

4. The method of claim 1, further comprising:
    establishing, by the primary source device, a group, wherein the primary source device is a group owner, and wherein the secondary source device is a group member.

5. The method of claim 1, further comprising:
    synchronizing a clock of the primary source device with a clock of the secondary source device.

6. A primary source device comprising one or more processors configured to:
    transmit, to a sink device and via a media share session between the primary source device and the sink device, a plurality of packets containing media data generated by the primary source device for output at an interface of the sink device, wherein each packet of the plurality of packets includes a respective sequence number;
    during operation of the wireless media share session, transfer, from the primary source device to a secondary source device and using a wireless link, transmission rights to the media share session with the sink device, wherein, to transfer the transmission rights, the one or more processors are configured to:
        transmit, to the sink device, a final packet that includes a final sequence number; and
        transmit, to the secondary source device, a rights granted communication comprising a sequence number value, wherein the sequence number value corresponds to a value of the final sequence number; and
    forward, to the sink device and via the media share session, a plurality of packets containing media data generated by the secondary source device for output at the interface of the sink device, wherein, to forward the plurality of packets, the one or more processors are configured to:
        receive, from the secondary source device, a first packet including a first sequence number, wherein the first sequence number is equivalent to the final sequence number plus one; and transmit the packet received from the secondary source device to the sink device for output at the interface of the sink device.

7. The device of claim 6, wherein the one or more processors are further configured to:
receive, from the secondary source device, a rights request communication,
wherein the transmission rights are transferred from the primary source device to the secondary source device in response to receiving the rights request communication.

8. The device of claim 7, wherein the secondary source device is a first secondary source device, and wherein the one or more processors are further configured to:
determine that a second secondary source device has the transmission rights;
transmit, to the second secondary source device, a release rights communication;
receive, from the second secondary source device, a final packet that includes a final sequence number; and
receive, from the second secondary source device, a rights released communication,
wherein the transmission rights are transferred from the primary source device to the first secondary source device in response to receiving the rights released communication, and wherein the one or more processors are configured to transfer the transmission rights to the first secondary source device by at least:
transmitting, to the first secondary source device, a rights granted communication comprising a sequence number value, wherein the sequence number value corresponds to a value of the final sequence number included in the final packet received from the second secondary source device.

9. The device of claim 6, wherein the one or more processors are further configured to:
establish a group, wherein the primary source device is a group owner, and wherein the secondary source device is a group member.

10. The device of claim 6, wherein the one or more processors are further configured to:
synchronize a clock of the primary source device with a clock of the secondary source device.

11. A primary source device comprising:
means for transmitting, to a sink device and via a media share session between the primary source device and the sink device, a plurality of packets containing media data generated by the primary source device for output at an interface of the sink device, wherein each packet of the plurality of packets includes a respective sequence number;
means for transferring, during operation of the wireless media share session and from the primary source device to a secondary source device using a wireless link, transmission rights to the media share session with the sink device, wherein the means for transferring the transmission rights comprise:
means for transmitting, to the sink device, a final packet that includes a final sequence number; and
means for transmitting, to the secondary source device, a rights granted communication comprising a sequence number value, wherein the sequence number value corresponds to a value of the final sequence number; and
means for forwarding, to the sink device and via the media share session, a plurality of packets containing media data generated by the secondary source device for output at the interface of the sink device, wherein the means for forwarding the plurality of packets comprise:
means for receiving, from the secondary source device, a first packet including a first sequence number, wherein the first sequence number is equivalent to the final sequence number plus one; and
means for transmitting the packet received from the secondary source device to the sink device for output at the interface of the sink device.

12. The device of claim 11, further comprising:
means for receiving, from the secondary source device, a rights request communication,
wherein the transmission rights are transferred from the primary source device to the secondary source device in response to receiving the rights request communication.

13. The device of claim 12, wherein the secondary source device is a first secondary source device, the device further comprising:
means for determining that a second secondary source device has the transmission rights;
means for sending, to the second secondary source device, a release rights communication;
means for receiving, from the second secondary source device, a final packet that includes a final sequence number; and
means for receiving, from the second secondary source device, a rights released communication,
wherein the transmission rights are transferred from the primary source device to the first secondary source device in response to receiving the rights released communication, and wherein the means for transferring the transmission rights comprise:
means for transmitting, to the first secondary source device, a rights granted communication comprising a sequence number value, wherein the sequence number value corresponds to a value of the final sequence number included in the final packet received from the second secondary source device.

14. The device of claim 11, further comprising:
means for establishing, by the primary source device, a group, wherein the primary source device is a group owner, and wherein the secondary source device is a group member.

15. A non-transitory computer-readable storage medium storing instructions that, when executed, cause one or more processors of a primary source device to:
transmit, to a sink device and via a media share session between the primary source device and the sink device, a plurality of packets containing media data generated by the primary source device for output at an interface of the sink device, wherein each packet of the plurality of packets includes a respective sequence number;
during operation of the wireless media share session, transfer, from the primary source device to a secondary source device and using a wireless link, transmission rights to the media share session with the sink device, wherein the instructions that cause the one or more processors to transfer the transmission rights comprise instructions that cause the one or more processors to:
transmit, to the sink device, a final packet that includes a final sequence number; and
transmit, to the secondary source device, a rights granted communication comprising a sequence number value, wherein the sequence number value corresponds to a value of the final sequence number; and
forward, to the sink device and via the media share session, a plurality of packets containing media data generated by the secondary source device for output at the interface of the sink device, wherein the instructions that cause the one or more processors to forward the plurality of packets comprise instructions that cause the one or more processors to:

receive, from the secondary source device, a first packet including a first sequence number, wherein the first sequence number is equivalent to the final sequence number plus one; and transmit the packet received from the secondary source device to the sink device for output at the interface of the sink device.

16. The non-transitory computer-readable storage medium of claim 15, further comprising instructions that, when executed, cause the one or more processors to:

receive, from the secondary source device, a rights request communication, wherein the instructions that cause the one or more processors to transfer the transmission rights from the primary source device to the secondary source device comprise instructions that cause the one or more processors to transfer the transmission rights from the primary source device to the secondary source device in response to receiving the rights request communication.

17. The non-transitory computer-readable storage medium of claim 16, wherein the secondary source device is a first secondary source device, and wherein the non-transitory computer-readable further comprises instructions that, when executed, cause the one or more processors to:

determine that a second secondary source device has the transmission rights;

transmit, to the second secondary source device, a release rights communication;

receive, from the second secondary source device, a final packet that includes a final sequence number; and receive, from the second secondary source device, a rights released communication, wherein the transmission rights are transferred from the primary source device to the first secondary source device in response to receiving the rights released communication, and wherein the instructions that cause the one or more processors to transfer the transmission rights to the first secondary source device comprise instructions that cause the one or more processors to:

transmit, to the first secondary source device, a rights granted communication comprising a sequence number value, wherein the sequence number value corresponds to a value of the final sequence number included in the final packet received from the second secondary source device.

18. The non-transitory computer-readable storage medium of claim 15, further comprising instructions that, when executed, cause the one or more processors to:

establish a group, wherein the primary source device is a group owner, and wherein the secondary source device is a group member.

* * * * *